UNITED STATES PATENT OFFICE.

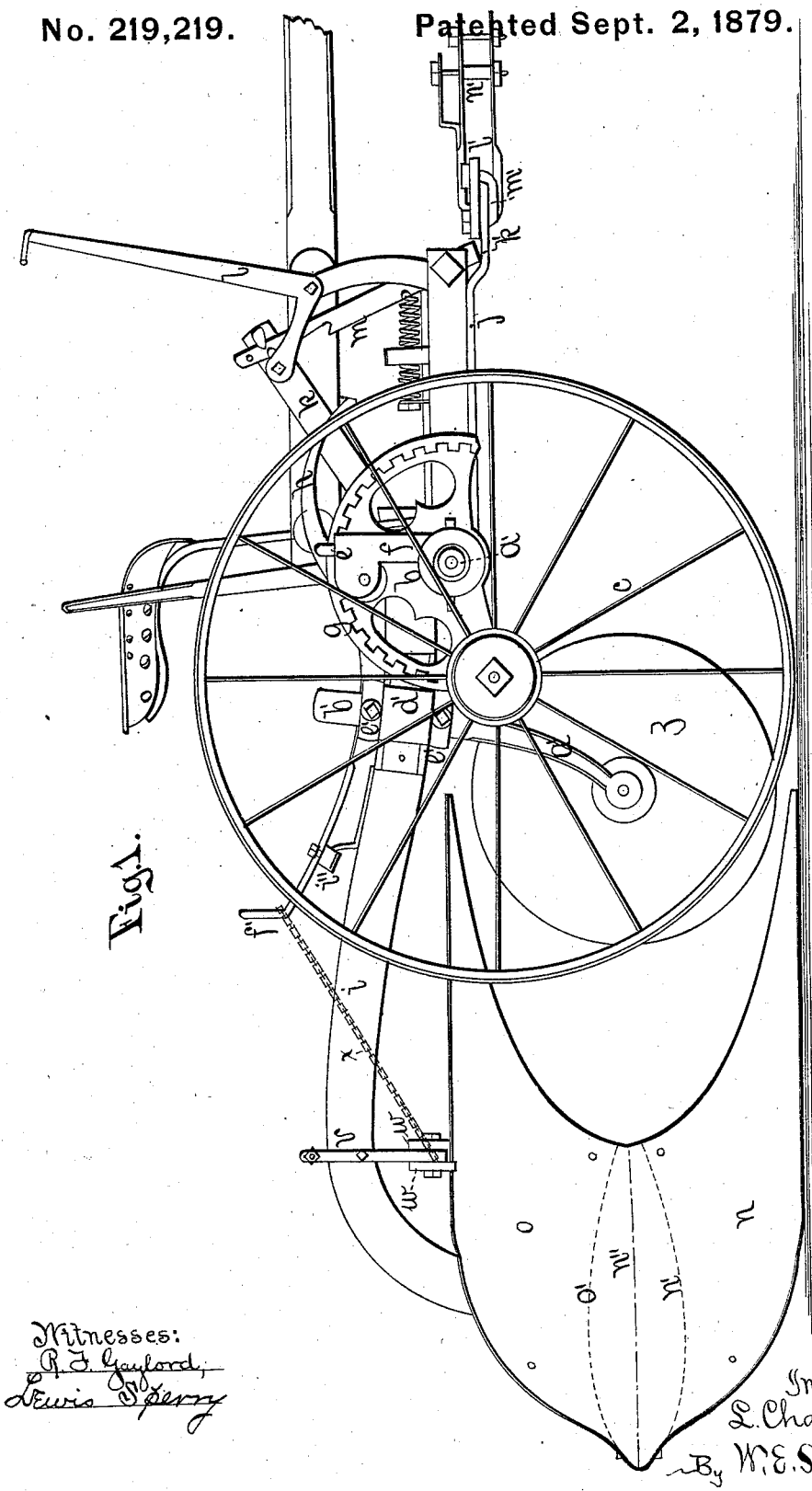

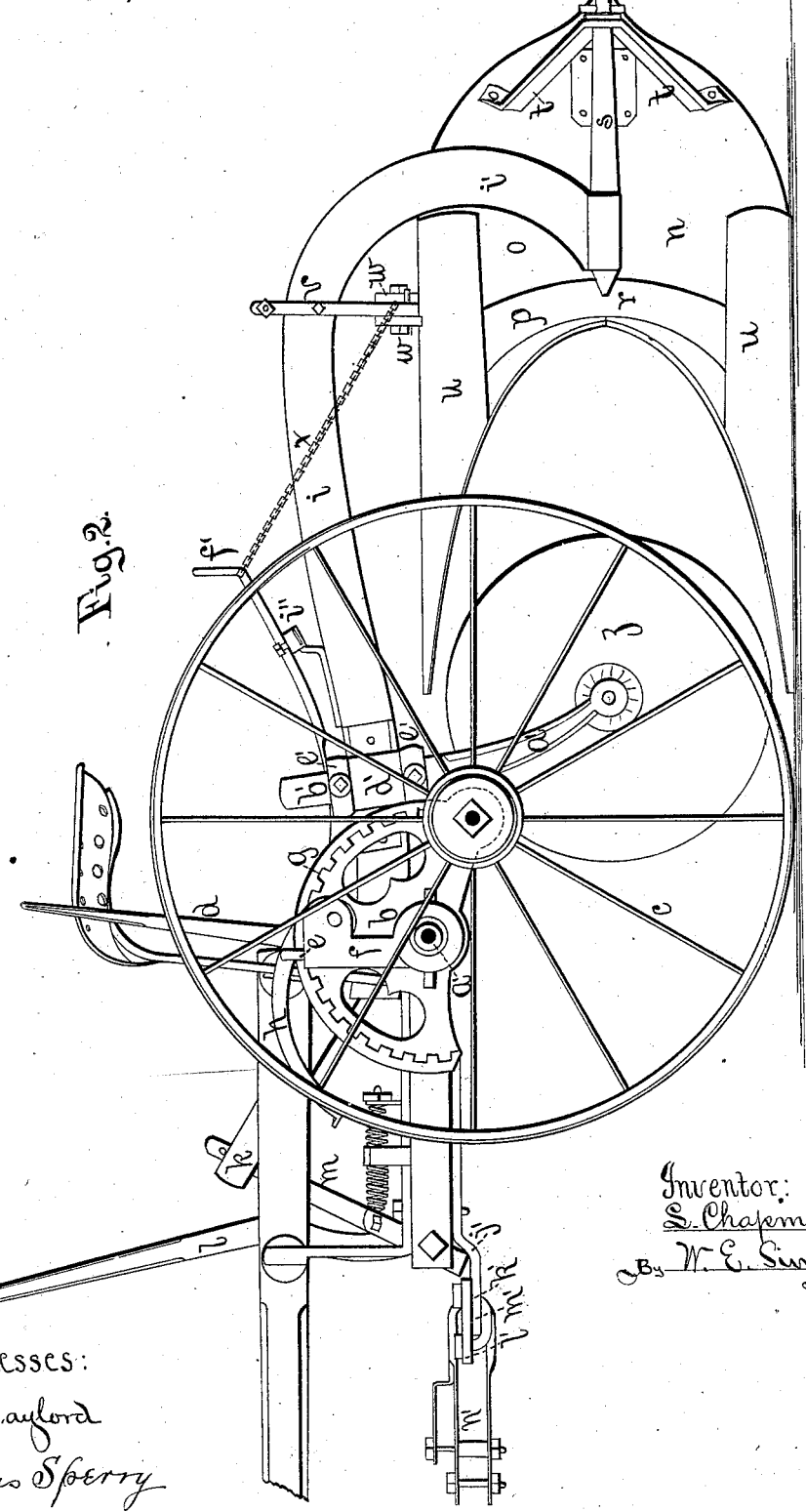

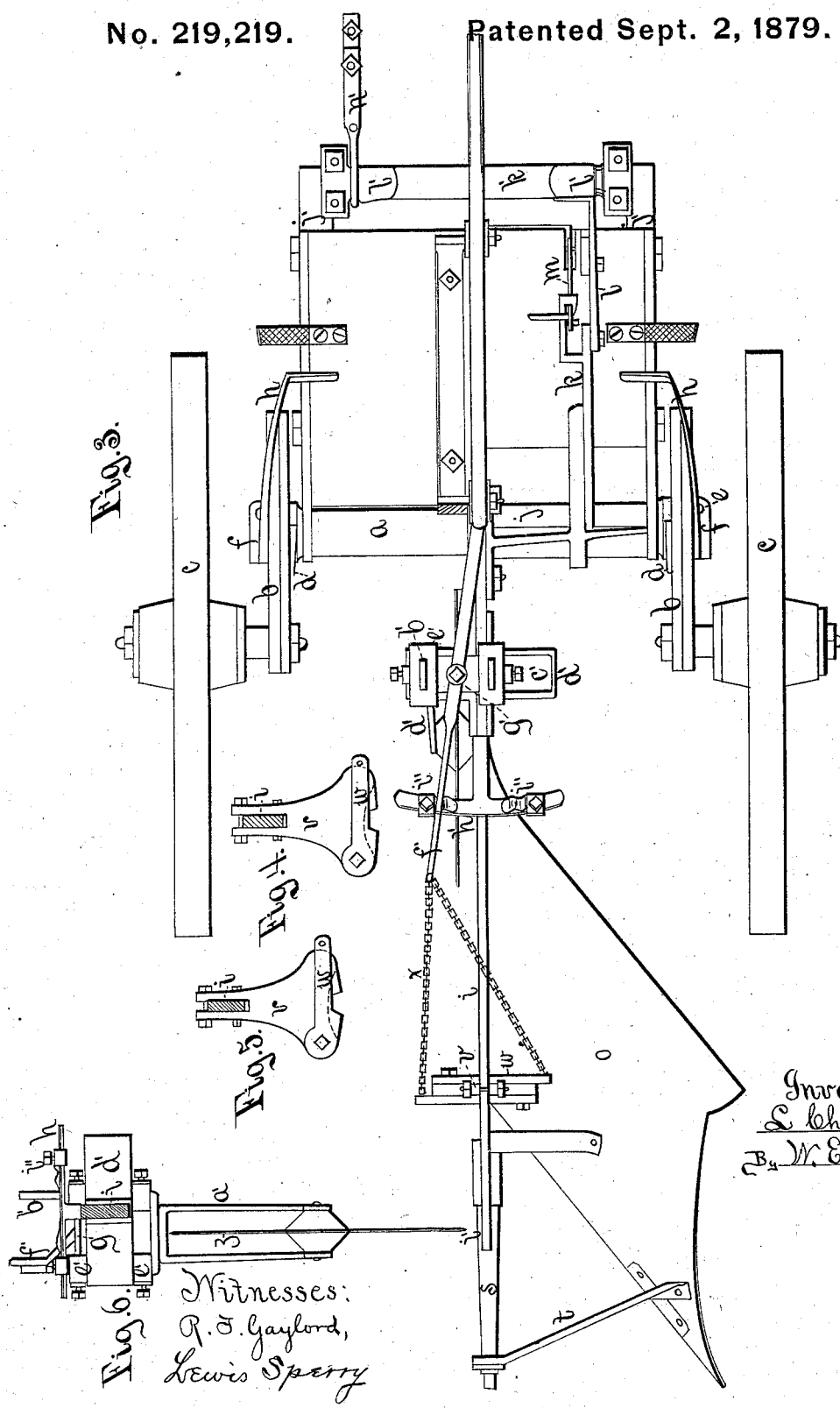

LUKE CHAPMAN, OF COLLINSVILLE, CONNECTICUT, ASSIGNOR TO THE COLLINS COMPANY, OF SAME PLACE.

IMPROVEMENT IN REVERSIBLE SULKY-PLOWS.

Specification forming part of Letters Patent No. 219,219, dated September 2, 1879; application filed January 24, 1879.

*To all whom it may concern:*

Be it known that I, LUKE CHAPMAN, of Collinsville, in the county of Hartford and State of Connecticut, have invented a certain new and useful Improvement pertaining to a Reversible Sulky-Plow, of which the following is a specification, reference being had to the accompanying drawings, where—

Figure 1 is a side view or elevation of the machine with the plow adjusted as right-hand plow. The view is from the furrow side. The plow is not in adjustment for plowing, but the bottom of the plow is on a level with the bottom of the wheels, which wheels are on the same level. Fig. 2 is a view of the machine in the same adjustment from the opposite or land side. Fig. 3 is a view of the top of the machine in the same adjustment. The seat for the rider is not shown in this view. Fig. 4 is a detail view showing the front side of the latching apparatus for holding the plow to its right and left adjustments. Fig. 5 is a detail view showing the rear side of the latching apparatus. Fig. 6 is a detail view showing from the rear the apparatus for shifting the colter to its right and left adjustments.

I will first describe the mechanism, and then point out by claims the parts in which my invention consists.

The letter $a$ denotes the non-rotating main axle, to each end of which is pivoted a crank-arm, $b\ b$, bearing each a wheel, $c\ c$. These crank-arms, and with them the wheels, are actuated by hand-levers $d\ d$, one to each crank-arm, and by means of them the wheels are each raised and lowered, relatively to the main axle, as becomes necessary in the various adjustments of the machine. The crank-arms are held at desired adjustments by the spring-pawls $e\ e$, borne by and sliding in the pawl-sockets $f\ f$, which are rigid on the main axle, striking into the ratchets $g\ g$, which are on the crank-arms. The letters $h\ h$ denote foot-levers, which are used to unmesh the pawls $f\ f$ from the ratchets $g\ g$.

The plow-beam $i$ is rigidly attached to the sleeve $j$, which is loose on the main axle, and from which projects forward a foot-lever, $k$, on which the operator puts his foot when he would raise or lower the plow relatively to the main axle. The letter $l$ denotes a hand-lever, used to assist the foot-lever $k$, and $m$ a ratchet-pawl for holding lever $k$ to a desired adjustment.

So far the parts described are in themselves, and apart from combinations with other parts hereinafter described, not substantially unlike mechanisms described and shown in former Letters Patent and applications for Letters Patent of mine.

The right-hand plow I denote by the letter $n$, the left-hand plow by the letter $o$, and the one double plow, made up of these two parts, by the conjoined letters $n\ o$. Now, these two plows $n$ and $o$ are corresponding duplicates joined on a straight line at the top, this line, of course, being at the top of plow $n$, or plow $o$ when that plow is adjusted for plowing, (denoted in the drawings by the broken line $n''$.) The shape in curvature of these plows $n$ and $o$ is peculiar. It is circular; by which I mean that the faces of the plows as conjoined into a double plow, will fit substantially to the periphery of a round cylinder.

These peculiarities have advantages. In use I make the lower part of what is for the time being the upper plow supplement the lower plow, so that the lower plow and the supplementary part of the upper plow are for the time being like one plow larger than either of the plows taken singly. The broken line $n'$ denotes the supplementary part of the plow $o$, and the line $o'$ the supplementary part of the plow $n$. These plows $n$ and $o$ may be made separate, and each may or may not have share and mold-board in separate parts; or the two plows—that is, the one double plow—may be made all in one piece. By this supplementary action of the plows I am enabled to use a smaller double plow than would otherwise be practicable, saving cost of metal at first, saving labor of manipulation in use, and enabling me to bring my plow-beam nearer the ground.

The plow-beam is provided with a downwardly-projecting arm, $i'$, preferably attained by curving the beam, as shown, which runs to the center of the double plow and is there pivoted to the double plow. A convenient means of getting this construction is to have the double standard $p$ attached to the double plow and bearing the pivot-point $r$, journaled into the arm $i'$. An arm, $s$, projects horizontally and rearwardly from the arm $i'$, and a brace, $t$, starting from the double plow, is pivoted to the end thereof. The double plow swings under the beam.

Each of the plows is provided with a landside, which serves for a latch-bar. The two are denoted by the letters $u\ u$. To the beam is clamped the latch-base $v$. On both the front and rear sides of this latch-base is pivoted a latch, $w\ w$, shouldered in opposite directions, so as to grasp a latch-bar, $u$, when offered to them. When the operator would reverse the plow, he first raises the beam, so that the double plow will swing clear, then raises the latches by pulling on the chain $x$, and the double plow, by its own weight, swings down, so that its rear is uppermost. The operator then with a hook grasps the plow he would raise uppermost, and draws it up till the latches catch and hold it.

When the double plow is reversed the colter must be adjusted accordingly. The colter $z$ is hung in the colter-frame $a'$, from which project upwardly two posts, $b'\ b'$, running, respectively, through the mortises $c'\ c'$ formed on the beam by suitable mortise-blocks $d'\ d'$, and provided above and below the mortises with the clamps $e'\ e'$, by which the colter may be adjusted up and down to take a less or greater cut. Resting by these clamps on the mortise-blocks the colter has a sidewise adjustment in the mortises. The operator shifts the colter by taking hold of the lever $f'$, pivoted at the fore end on a stationary pivot, also pivoted, through the agency of a short cross-bar, $g'$, to clamps $e'$, and riding farther back on the ratch-bar $h'$, provided with ratch-notches $i''\ i''$, made adjustable on the ratch-bar and held to place by set-screws.

When the double plow is reversed the line of draft needs to be shifted accordingly. A frame or platform, $j'$, is at the front of the machine. From its front projects the draft-bar $k'$, on which are the ratch-notches $l'\ l'$, made adjustable and held to adjustment by staples $m'\ m'$, provided with set-nuts. With the hook before mentioned the operator shifts the clevis $n'$, on which the draft is exerted, from one notch to the other when the double plow is reversed.

As a rule all the parts of the machine except the platform and sometimes parts of the wheels are of metal, mainly wrought and cast iron.

With reference to the fourth clause of the following claim I have to state that I am aware that it is not new in a reversible plow simply to have a clevis sliding from side to side or to increase or lessen the amount of play; but it is new to have the clevis-notches in blocks which are adjustable back and forth.

I claim as my invention—

1. The double plow provided with latch-bars $u\ u$, the plow-beam with arm $s$, and the latches $w\ w$, with block $v$, all combined to operate substantially as shown and described.

2. The colter $z$, with its frame $a'$ and posts $b'$, the clamps $e'$, the beam $i$, and the mortises $c'$, all combined to operate substantially as shown and described.

3. The colter $z$, with its frame and posts, the clamps $e$, the beam $i$, the mortises $c$, the lever $f'$, and the ratch-bar $h'$, provided with the adjustable ratch-notches $i''$, all combined to operate substantially as shown and described.

4. The draft-bar $k'$, the adjustable blocks having the ratch-notches $l'\ l'$, and the clevis $n'$, all combined to operate substantially as shown and described.

LUKE CHAPMAN.

Witnesses:
OLIVER F. PERRY,
CHARLES W. THAYER.